United States Patent [19]
Turner

[11] Patent Number: 6,087,799
[45] Date of Patent: Jul. 11, 2000

[54] SWITCHING CIRCUIT FOR A RELUCTANCE MACHINE

[75] Inventor: Michael James Turner, Leeds, United Kingdom

[73] Assignee: Switched Reluctance Drives Limited, Harrogate, United Kingdom

[21] Appl. No.: 09/100,280

[22] Filed: Jun. 19, 1998

[30] Foreign Application Priority Data

Jun. 20, 1997 [GB] United Kingdom .................. 9713136

[51] Int. Cl.$^7$ ..................................................... H02P 1/46
[52] U.S. Cl. ........................................... 318/701; 318/254
[58] Field of Search .................................... 318/701, 254

[56] References Cited

U.S. PATENT DOCUMENTS

| | | | |
|---|---|---|---|
| 4,379,984 | 4/1983 | Muller | 318/254 |
| 4,682,093 | 7/1987 | Murphy et al. | 318/701 |
| 5,233,509 | 8/1993 | Ghotbi | 363/89 |
| 5,304,882 | 4/1994 | Lipo et al. . | |
| 5,545,938 | 8/1996 | Mecrow | 310/156 |
| 5,576,943 | 11/1996 | Keir | 363/56 |
| 5,578,911 | 11/1996 | Carter et al. | 318/376 |
| 5,703,457 | 12/1997 | Davis | 318/701 |
| 5,739,662 | 4/1998 | Li | 318/701 |
| 5,742,139 | 4/1998 | Kolomeitsev | 318/254 |
| 5,767,638 | 6/1998 | Wu et al. | 318/254 |
| 5,825,112 | 10/1998 | Lipo et al. . | |
| 5,847,532 | 12/1998 | Webster | 318/701 |
| 5,929,590 | 7/1999 | Tang . | |
| 5,936,373 | 8/1999 | Li et al. . | |

FOREIGN PATENT DOCUMENTS

| | | |
|---|---|---|
| 0 074 752 B1 | 4/1986 | European Pat. Off. . |
| 0 455 869 A2 | 11/1991 | European Pat. Off. . |
| 0 533 158 A2 | 3/1993 | European Pat. Off. . |
| 44 16 342 C1 | 5/1995 | Germany . |

OTHER PUBLICATIONS

Barnes, M., et al., "Two Phase Switched Reluctance Drive With New Power Electronic Converter for Low Cost Applications", EPE '95: 6th European Conference on Power Electronics and Applications, Sevilla, Sep. 19–21, 1995, vol. 1, Conf. 6, Sep. 19, 1995, pp. 1.427–1.430.

Stephenson, J.M., et al., "The Characteristics, Design and Applications of Switched Reluctance Motors and Drives", PCIM '93 Conference and Exhibition, Nürnberg, Germany, Jun. 21–24, 1993.

*Primary Examiner*—Brian Sircus
*Attorney, Agent, or Firm*—Patterson & Keough, P.A.

[57] ABSTRACT

A switching circuit for a reluctance machine includes one or more half-bridge converter modules including serially connected switches connected between power rails $+V_{dc}$ and $-V_{dc}$. A pair of capacitors are also connected between the power rails, and the phase winding of the machine is connected at one end between transistors and at the other end between the capacitors. The switches act as separate power circuits, alternately conducting to excite the phase winding either during alternate phase conduction periods or during alternate groups of phase periods. The half-bridge modules are commercially readily available as cost-effective preassembled items.

14 Claims, 8 Drawing Sheets

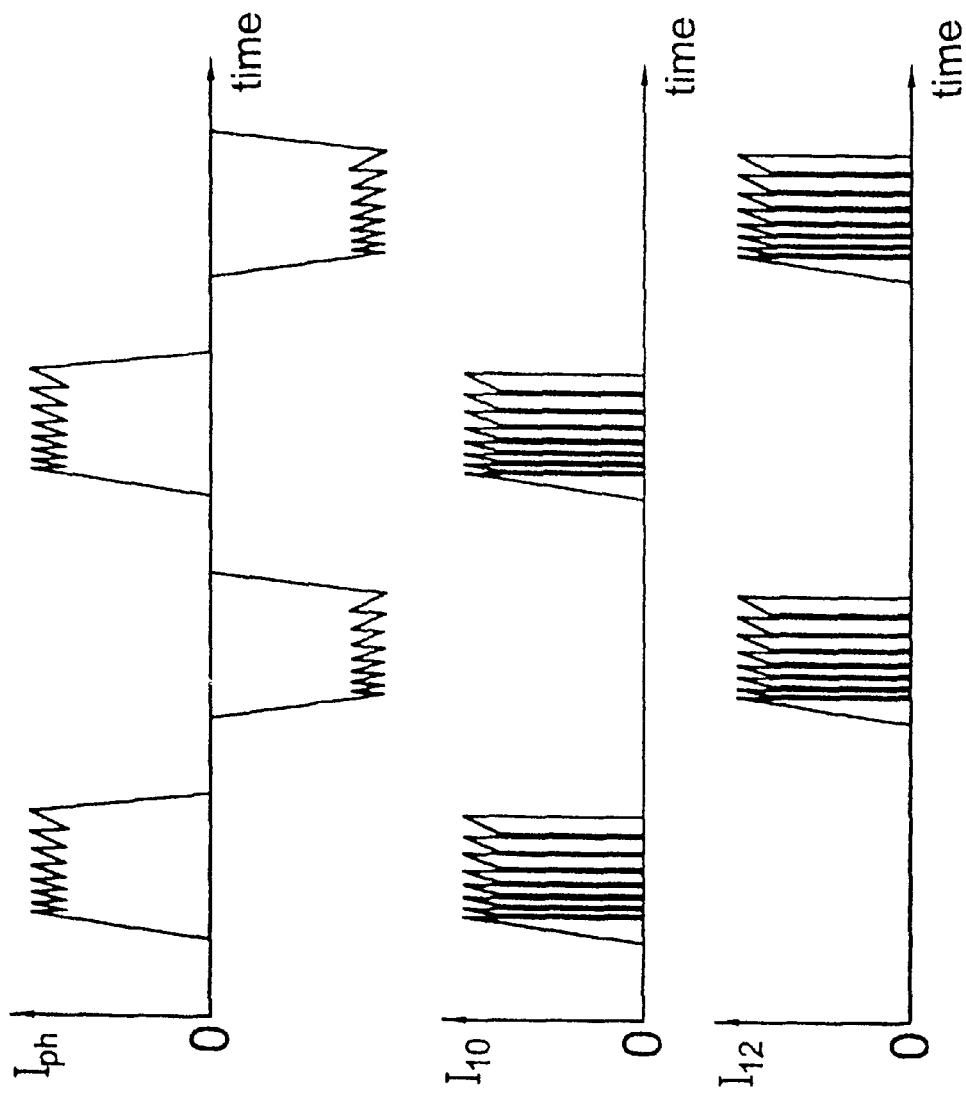

SWITCHING CIRCUIT FOR A RELUCTANCE MACHINE

BACKGROUND OF THE INVENTION

1. Field of the Invention

This invention relates to a switching circuit for a reluctance machine.

2. Description of Related Art

FIGS. 1(a) and 1(b) illustrate a typical 3-phase switched reluctance (SR) machine and a common electronic switching circuit which may be used to control the machine. The machine includes a stators defining salient stator poles 1, 1', 2, 2', 3, 3' on which are wound phase windings w, of which only one is shown in association with a set of poles 2, 2', and a rotor r with salient poles 4, 4' and 5, 5'. It should be noted that this doubly salient machine is quite different in its characteristics and performance from singly salient reluctance machines. The latter are generally referred to as synchronous reluctance machines and operate on sinusoidal or quasi-sinusoidal voltage and current waveforms.

Electronic switching circuits are arranged to supply unidirectional current to the phase windings w. In the switching circuit, each phase winding in the machine of FIG. 1(a) is associated with a circuit leg comprising a pair of electronic switches in series with each winding w across a dc supply. A description of switched reluctance machines, and their design and control can be found in the paper 'The Characteristics, Design and Applications of Switched Reluctance Motors and Drives' by Dr. J. M. Stephenson et al., incorporated herein by reference, presented at PCIM '93 Conference and Exhibition at Nurnberg, Germany between Jun. 21st and 24th, 1993.

The skilled person will be aware that an SR motor requires a bipolar excitation voltage applied to the phase winding so as to force the flux in the phase winding up or down as and when required, according to the timing of the control strategy used. However, because the flux in a given phase is generally unipolar, the current need not reverse during a phase period. It is commonly accepted that SR machines are conventionally run with unipolar currents.

The phase currents in, for example, a 3-phase SR machine are generally spaced by 120° in respect of their fundamental frequency component, but they do not always sum to zero due to the non-sinusoidal shape caused by their harmonic content. This means that a 3-phase switching circuit for an SR machine cannot necessarily use a conventional star (wye)- or delta-connected inverter by which to derive dc power from an ac source.

A well-known circuit suitable for switched reluctance machines, which can be operated in several ways, is shown in FIG. 1(b). In the first method of operating the circuit, both switches t of a leg are switched on and off together so that at switch-off the current transfers from the switches to flow through the diodes d. In the second method, only one of the two switches t is opened so that the current circulates, or "freewheels", due to the stored magnetic energy associated with the winding through one switch and one diode. Both switches are turned off at the end of a phase conduction period.

At low speed, the current in the phase winding is typically controlled by chopping, in which case the machine is said to be 'current fed'.

FIGS. 2(a) and (b) illustrate typical chopped motoring and generating phase winding current waveforms, respectively, without freewheeling. The current is illustrated in relation to angle θ of rotation of the rotor with respect to the stator.

At higher speeds, the time required for the growth and decay of flux is significant in relation to the phase period (defined as the time corresponding to one cycle of phase inductance variation). The time rate of change of flux linkage is determined by the voltage applied to the winding, and the rate of change with respect to angle therefore falls as the speed rises. At these higher speeds there is, therefore, only a single pulse of current in the switches and diodes in each phase period. Corresponding phase winding currents are illustrated in FIGS. 3(a) and (b), respectively, for motoring and generating operation. Operation in this manner is called the "single-pulse" mode of operation in which the machine is said to be 'voltage fed'.

It should be noted that the 'conduction angle' θ in FIGS. 3(a) and (b) is the angle over which the switches are closed: $\theta_{on}$ is the 'switch-on angle' and $\theta_{off}$ is the 'switch-off angle'. Furthermore, the effect of the phase winding resistance has been assumed to be negligible in constructing the waveforms of FIGS. 3(a) and (b). The flux linkage waveform ψ of the phase winding is illustrated by the broken lines. Following closing of the switches t in FIG. 1(b) associated with a phase winding, the flux linkage grows linearly. When the switches are opened, the flux linkage falls linearly, the current flowing through the diodes d imposing a voltage of $-V_s$ on the windings.

In order to maintain the torque developed by the machine as the speed rises under single-pulse control, it is necessary to maintain the flux amplitude. This is commonly achieved by increasing the conduction angle with speed.

Control of this single-pulse mode of operation with full torque capability at higher speeds is exercised by variation of the angle of a rotor pole relative to a particular stator pole at which the switches are closed (the switch-on angle) and the angle over which the switches remain closed (the previously mentioned conduction angle).

The circuit of FIG. 1(b) is well-suited to controlling the current in the inherently inductive windings of an SR machine. Turning both switches on applies the full supply voltage to the winding of a particular leg, forcing the flux (and, therefore, the current) to the required value at the maximum possible rate. Opening both switches then brings the diodes into conduction and forces the flux (and the current) down quickly. Opening only one switch provides a freewheel path for the winding current, with only a small negative winding voltage—flux then falls at only a relatively low rate. By incorporating these three modes into a suitable control strategy, the winding flux and/or current can be controlled effectively and with relatively low switching losses. Stored energy in the winding (as at the end of a phase period when the switches are turned-off) is returned to the supply via the diodes.

The circuit of FIG. 1(b) is also fault-tolerant. Because the winding is placed between the two switches, there is no possibility of a direct short circuit across the dc supply.

There are, however, drawbacks to the circuit of FIG. 1(b). Firstly, it requires four power terminals for each leg (or phase). Secondly, each phase requires a minimum of two separate cables to connect it to the motor. A third problem is the lack of medium- and high-power preassembled semiconductor modules with the required circuit configuration.

The second of the above drawbacks (the need for at least two cables per phase) can be overcome by using the so-called H circuit shown in FIG. 4. In this circuit the switched reluctance machine windings are connected to a common center point between the two smoothing capacitors C. Half the supply voltage is then available for inducing flux growth and half is available for forcing the flux down. The inherent operation of the basic H circuit is restricted to voltage (single-pulse) control of an SR machine having an even number of phases. The even number of phases is required because some of the energy drawn from, say, the top smoothing capacitor to the winding of phase A is returned to the lower capacitor at switch off. Unless this energy transfer is matched, by an equal one in the other direction from, say, the winding of phase B, the midpoint voltage on the capacitors will drift, eventually reaching the top rail voltage. Given an even number of phases, the circuit still will not work if the windings are energized in a current controlled (chopping) mode because there will inevitably be slight mismatches between the phase winding currents. In the voltage controlled (single pulse) mode, the circuit is self-stabilizing because any small drift of the capacitor midpoint potential results in an increased current drain from the capacitor having the higher voltage. However, with current control, no such stabilizing mechanism exists during repeated chopping cycles, and external circuitry, such as that described in EP-A-0074752, incorporated herein by reference, must be used to regulate the midpoint potential.

SUMMARY OF THE INVENTION

It is an object of the present invention to provide an alternative switching circuit for controlling a switched reluctance machine.

It is a further object of the invention to provide a switching circuit that can be assembled from readily available electronic component packages.

In a preferred embodiment, the invention can make use of the half-bridge circuit which is readily available in preassembled packages. According to an embodiment of the invention, the two switch devices are energized in turn for each excitation of the phase winding to which the circuit is connected. In effect, the switch devices act as two independent power circuits connected so that they share the switching burden either by being energized alternately or for alternate groups of successive phase excitations.

BRIEF DESCRIPTION OF THE DRAWINGS

The present invention can be put into practice in various ways, some of which will now be described by way of example with reference to the accompanying drawings in which:

FIG. 6(b) illustrates phase and switching currents for switching at low speeds according to an embodiment of the invention;

DETAILED DESCRIPTION OF THE DRAWINGS

Figure 1A:
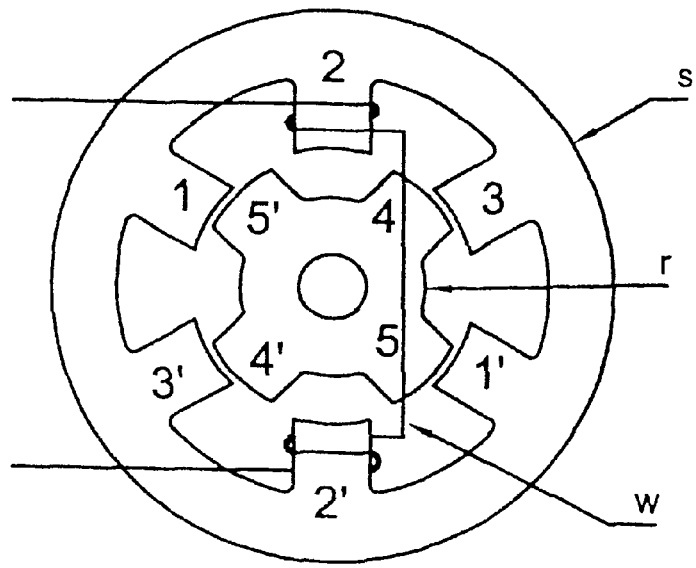
FIG. 1(a) is a cross-section of a conventional switched reluctance machine.
Figure 1B:
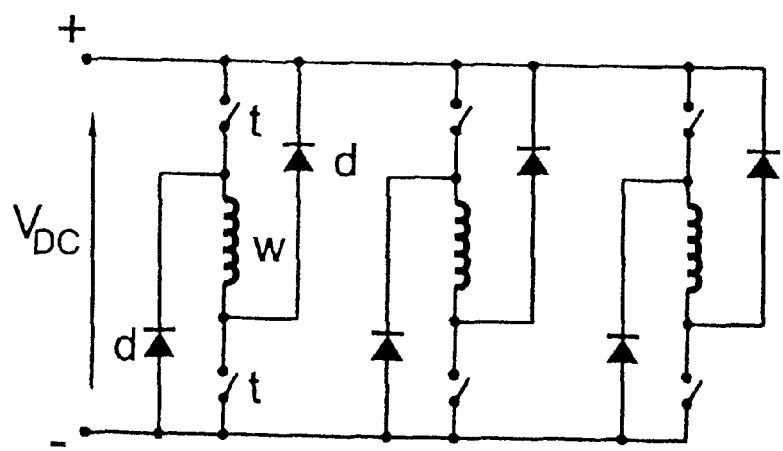
FIG. 1(b) is a circuit diagram of a conventional switching circuit for the machine of FIG. 1(a)
Figure 2A:
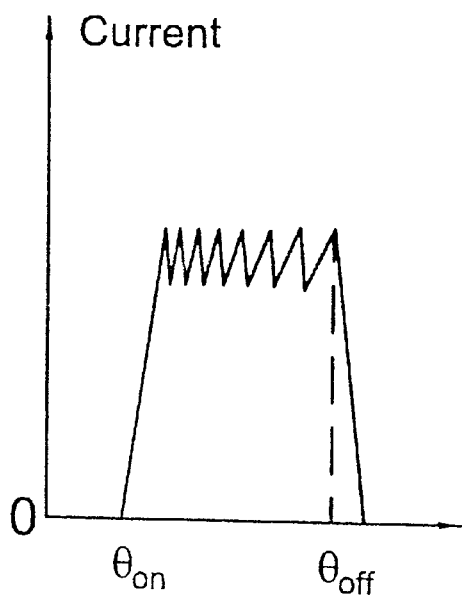
FIGS. 2(a) and (b) are illustrations of motoring and generating phase currents at low speed.
Figure 2B:
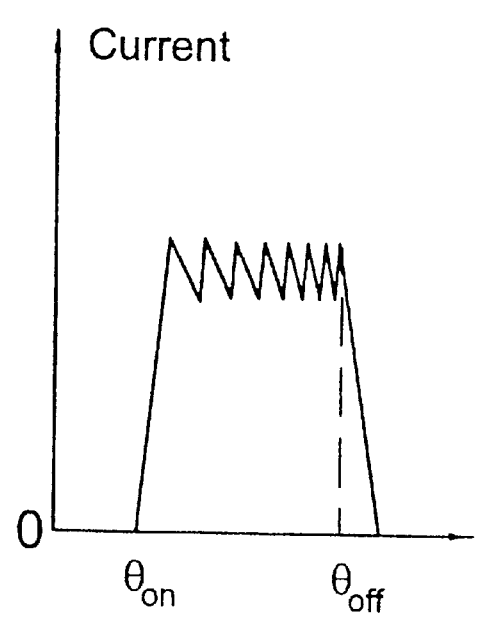
Figure 3A:
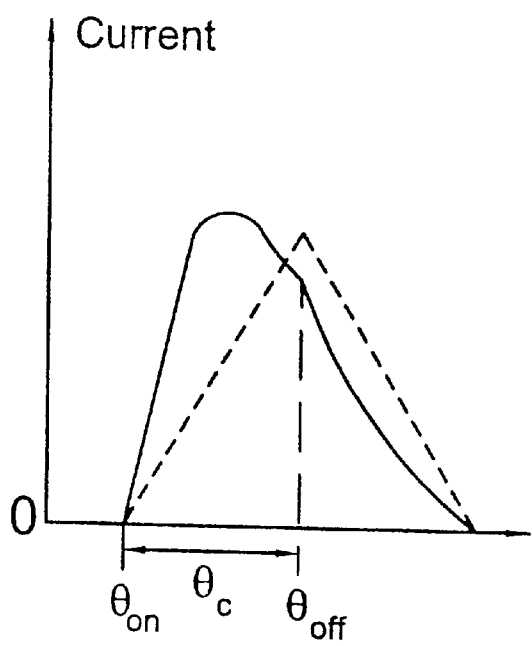
FIGS. 3(a) and (b) are illustrations of motoring and generating phase current and flux for high speeds.
Figure 3B:
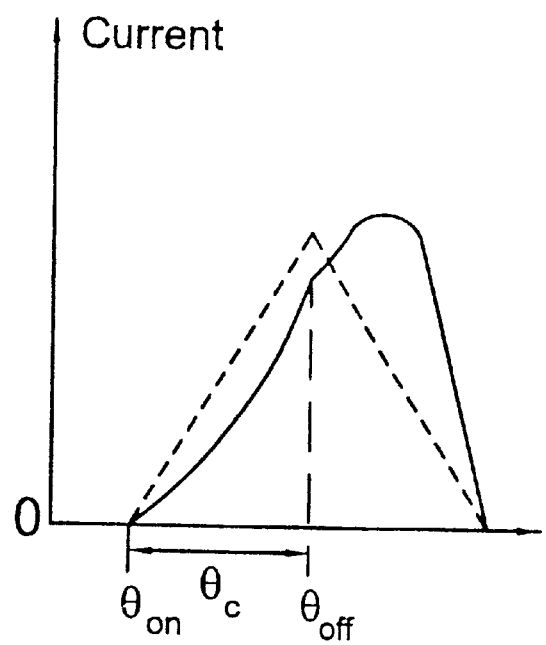
Figure 4:
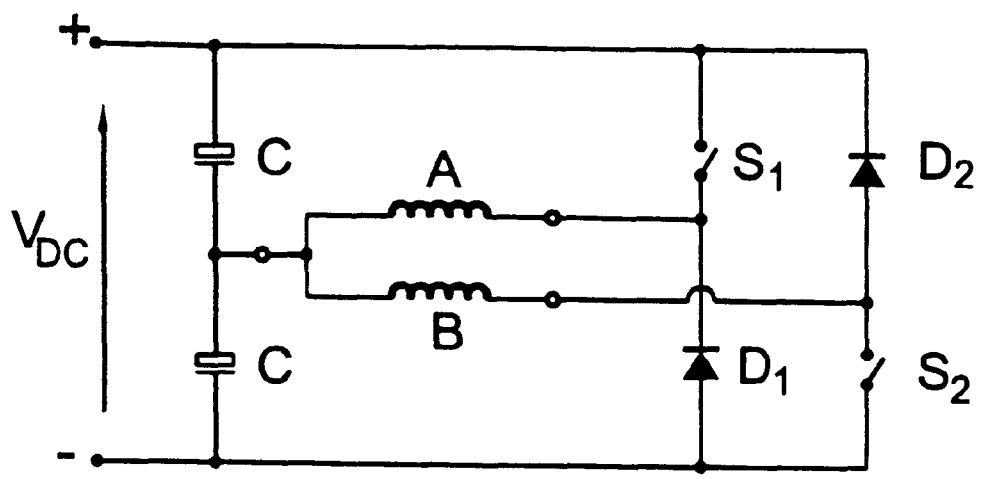
FIG. 4 is a circuit diagram of an alternative conventional switching circuit for a switched reluctance machine.
Figure 5:
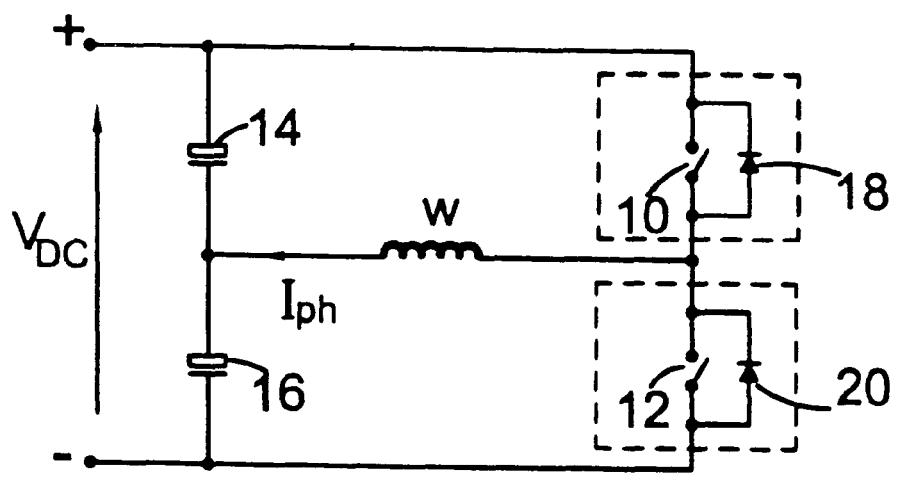
FIG. 5 is a circuit diagram of a switching circuit according to an embodiment of the invention.

Referring to FIG. 5, one leg of a switching circuit for a reluctance machine comprises first and second power switches 10 and 12. The power switches may be any suitable devices, such as bipolar power semiconductor transistors, power field effect transistors or thyristors. One side of the first switch 10 is connected with a positive power supply rail $+V_{DC}$ and the other side of the second switch 12 is connected with a negative power supply rail $-V_{DC}$. In between, the first and second switches are connected together and also to one end of the phase winding w of the reluctance machine to be controlled (see FIG. 1(a)). The other end of the winding w is connected between a pair of serially connected capacitors 14 and 16. The opposite ends of the capacitors are also respectively connected with the first and second power supply rails $+V_{DC}$ and $-V_{DC}$. A diode 18/20 is connected across each of the switches 10/12.

In practice, the pairs of switches and diodes connected as shown in FIG. 5 are available in standard electronic component packages as half-bridge modules. The broken line boxes in FIG. 5 illustrate such an arrangement, where the module contains one switch and one diode. Alternative forms are available where all four devices (10, 12, 18 and 20) are contained in one single module. Examples of these are the insulated gate bipolar transistor-based packages MG25Q2YS40 and MG150Q2YS40, manufactured by Toshiba Corporation, Tokyo, Japan. The skilled person will appreciate that other variants exist which will also be suitable in particular applications to equal effect.

Figure 10A:
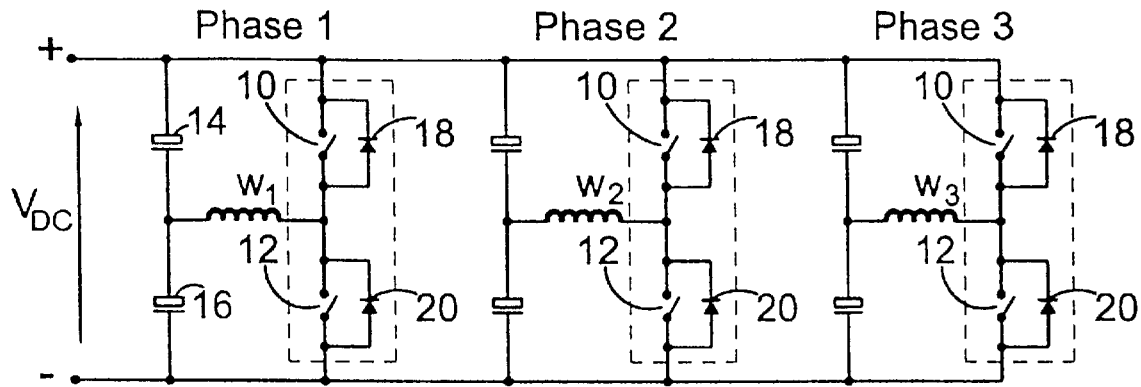
FIGS. 10(a) and (b) are circuit diagrams of alternative switching circuits according to embodiments of the invention.
Figure 10B:
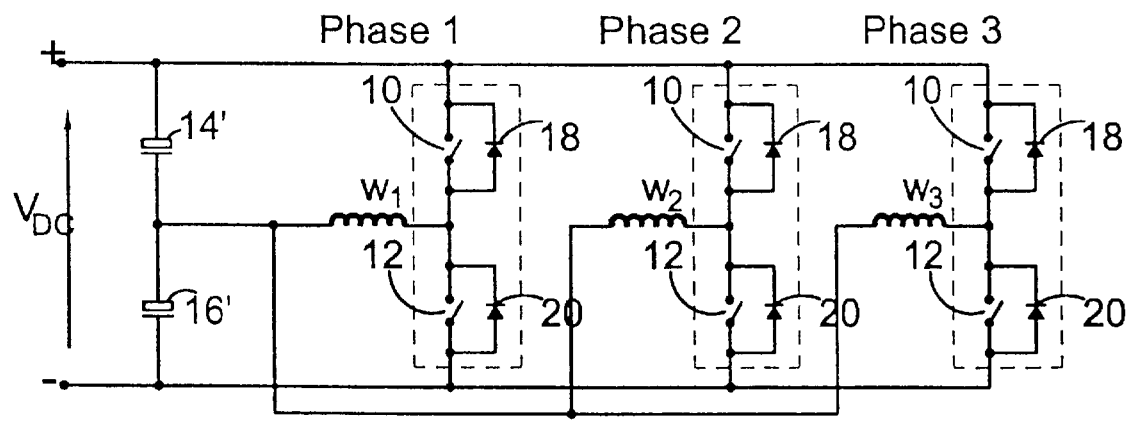

The switches 10 and 12 shown in FIG. 5 are typically implemented as insulated gate bipolar transistors, but it will be appreciated by the skilled person that other power switching devices could be used and many are available in the half-bridge module packages referred to. It will also be appreciated that the circuit of FIG. 5 is for a single phase winding of a reluctance machine. This may be the only phase of the machine or one of a plurality. In the case of more than one phase (such as the machine of FIG. 1(a)), a circuit according to embodiments of the invention can be connected to each phase, as shown in FIG. 10(a), in which like components have been assigned the same reference numerals as in FIG. 5 for each of the three phases illustrated. An alternative form of multiphase circuit is shown in FIG. 10(b) in which a pair of capacitors 14' and 16' are connected between the power rails $+V_{DC}$ and $-V_{DC}$. The common midpoint between the capacitors is connected with one end of each of the windings. It will be apparent to one skilled in the art that any of the capacitors in FIGS. 5, 10(a) and 10(b) could comprise two or more individual capacitors connected in series or parallel to yield the current and voltage ratings required for any particular application.

The circuit of FIG. 5 uses either the switch/diode pair 10 and 20 or the pair 12 and 18 for a phase cycle of the machine. Considering the motoring condition of the SR machine and referring to FIG. 6(a), in which single-pulse control is illustrated, it will be seen that the phase current $I_{ph}$, i.e. the current in the winding, is bipolar. The current in each switch, $I_{10}$ and $I_{12}$, indicates that the switches are operated alternately. For the conduction cycle for the phase winding w in FIG. 5, the switch 10 is switched on to be conducting at point A in FIG. 6(a) at the start of the conduction period. Current in the winding w grows in the conduction period and the switch 10 is opened at the point B at the end of the conduction period, causing a voltage reversal across the winding w and flux (and hence current) decay. The decaying current circulates through the winding w, the capacitor 16 and the diode 20.

Figure 6A:
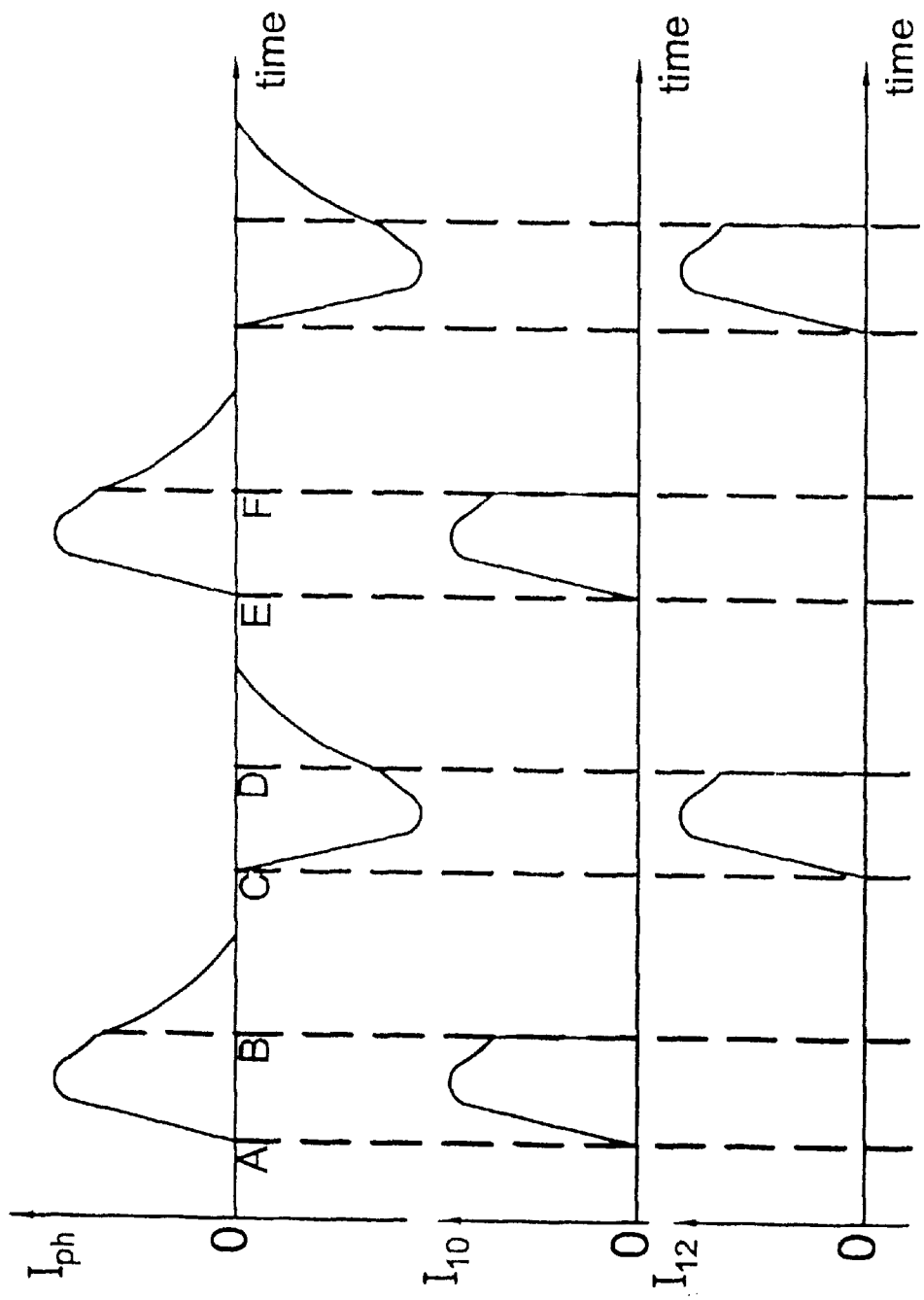
FIG. 6(a) illustrates phase and switching currents for switching at higher speeds according to an embodiment of the invention.

As indicated in FIG. 6(a), at the start of the next conduction period at point C, the switching duty is transferred to the switch 12 which is closed while the switch 10 remains open. In this case, the phase current flow is in the opposite sense to that for the switch 10. The current grows in the opposite sense until the end of the conduction period at point D when the switch 12 is opened. With no path available to the decaying current in the winding through the switch 12, the current now circulates through the diode 18 and the capacitor 14.

At low speeds, in current-controlled operation or chopping, the current in each phase period will reverse according to an otherwise conventional chopping strategy. This is illustrated in FIG. 6(b).

The circuit uses the switch/diode combinations of 10 and 20, or 12 and 18 for each phase period. The circuit is, in effect, a pair of power circuits connected together to provide winding excitation current of a polarity which, in the manner described above, alternates on successive phase periods. This alternating duty reduces capacitor voltage swings to a minimum. However, it is equally possible to arrange for the switches to be operated in alternate groups or bursts of duty, swapping between switches only after the passing of a number of phase periods.

It should be noted that, with a polyphase embodiment of this invention, the phases are operated quite independently of each other. This is in contrast to an inverter-fed reluctance or induction machine, in which the phase currents and voltages are dependent on each other (and in which the phase currents normally sum to zero).

It should also be noted that when the machine is operated according to the invention the current in the phase winding is unidirectional during any one phase period (i.e. it is unipolar). During alternate phase periods, or alternate groups of phase periods, the current direction changes, as shown in FIGS. 6(a) and 6(b). The frequency of current reversal is therefore a maximum of half the frequency of the electrical cycle. This is in contrast to inverter-fed machines where the frequency of voltage and current reversal is tied exactly to the electrical cycle.

Because each phase excitation draws current from (and returns energy to) both capacitors, there should be no long-term drift of the midpoint voltage between the capacitors. In practice, a resistor (or some other means of balancing voltage) may be fitted across each capacitor to allow for small errors (due to timing differences, etc.) between alternate cycles, and to allow for slightly different capacitor values while in the current control or chopping mode. In more severe cases (perhaps because of poor capacitor tolerances), active balancing will be required to monitor the midpoint potential between the capacitors and to modulate the operation of the switches 10 and 12 in some fashion so as to adjust the current drain and hence equalize the voltages across each capacitor. For example, the midpoint voltage could be monitored and used to address the SR control circuitry such that additional energy is drawn from the capacitor having the higher voltage to achieve a balance. This need not be a proportional controller which might be excessively complicated. A simple comparator-type circuit, with hysteresis, can be used to indicate an imbalance over a certain threshold. When the threshold is reached the controller addresses one switch continuously until the imbalance has fallen or even been reversed, after which normal alternate duty operation is restored.

Figure 7:
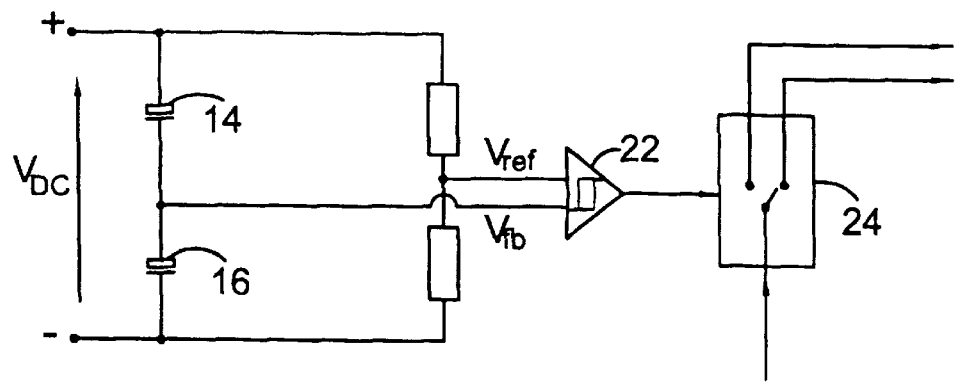
FIG. 7 illustrates a controller which may be used in a reluctance machine drive incorporating an embodiment of the invention.

FIG. 7 illustrates a hysteresis-based controller for this purpose. A positive voltage hysteresis comparator 22 compares a reference voltage $+V_{ref}$ with a feedback signal $V_{fb}$ indicative of the midpoint voltage between the capacitors 14 and 16. When the difference between the two voltage signals exceeds the predetermined threshold, the output from the comparator is applied to a selector switch 24 which switches operational duty from one switch to the other.

It will be appreciated that $V_{fb}$ rising in a positive sense above the threshold magnitude will cause the selector 24 to enable energization of the switch 12. If $V_{fb}$ falls below the negative threshold, the switch 24 will enable energization of the switch 10. The actual timed firing signals are derived from a conventional SR timing control circuit in conventional manner coincident with the beginning and the end of each conduction period. It will be appreciated by the person of ordinary skill that the above operation of the single phase arrangement of FIG. 5 applies to each of the phases in the circuits of FIGS. 10(a) and 10(b) mutatis mutandis.

Figure 8:
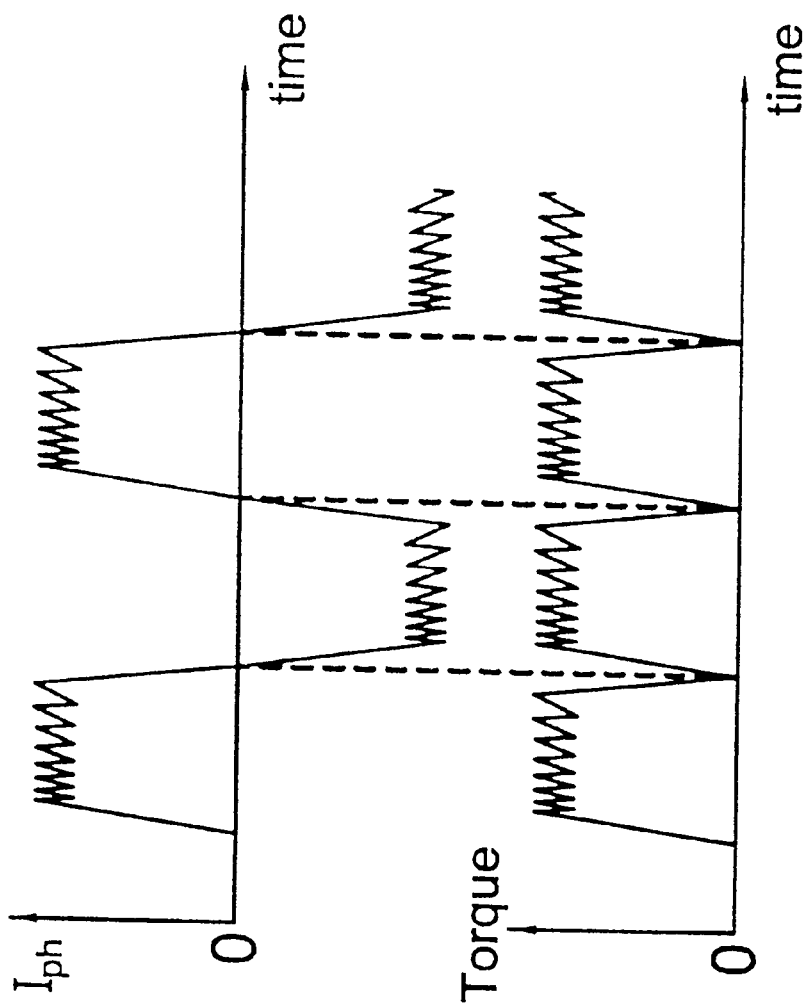
FIG. 8 illustrates phase and torque waveforms for a reluctance machine switched according to an embodiment of the invention in a stall condition.

In some situations the motor may be required to operate in a stalled condition in which it does not produce sufficient torque according to the normal switching sequence. The one or more phases connected with the circuit(s) according to this invention can be driven for extended periods by energizing either one of the switches. However, this creates an imbalance in the charges on the capacitors 14 and 16. This can be countered by swapping between switch/diode pairs exciting the same phase. The effect of transition between switch/diode pairs will be to cause perturbations in the torque output of the motor at the point of changeover. This is illustrated in FIG. 8 in which the phase current $I_{ph}$ swapped between switches is shown. At the transition, the torque output T is disturbed and a sharp drop in torque is created until the inverted phase current $I_{ph}$ according to the change in switch is established.

Where two phases are active simultaneously in a stall situation, it is possible to ensure that they both draw current from, and return current to, opposite capacitors. For example, if it were required to operate simultaneously phases 1 and 2 of FIG. 10(b), the winding $W_1$ of Phase 1 could be supplied by the top capacitor 14' via the top switch 10, and the winding $W_2$ of Phase 2 could be supplied by the bottom capacitor 16' via the bottom switch 12. In this way, the capacitor voltages are maintained at approximately equal values. This has the advantage that the two phases can supply continuous torque without the perturbations shown in FIG. 8. It would, of course, be possible to combine this mode of operation with an active method of midpoint balancing if required. For example, the current levels at which the two windings are operated could be modulated to adjust the midpoint voltage while still providing continuous torque.

The extended periods of duty to which a switch/diode pair is subjected in a stall situation are similar, in terms of the loading placed on the switches and the potential imbalance in the capacitors, to very low-speed operation. Extended periods of phase winding excitation are present in both. The techniques of swapping between switch/diode pairs in a stall situation can be applied during a phase period to address this. Thus, swapping between switch/diode pairs may take place during the same phase period according to the invention.

The circuit of the invention allows low-cost, readily available half-bridge inverter semiconductor modules to be used for SR machine control. For an n-phase motor it reduces the number of motor phase connections required from 2n (for the conventional circuit) to n+1, with no practical restrictions placed on the value of n. The reduction in the number of machine cables may be particularly valuable in applications requiring very long cable runs and, for example, in environmentally sealed motors where additional connections are costly and likely to increase the risk of undermining the integrity of the sealed unit.

The circuit of the invention can utilize each switch on average for only half the time as the equivalent in a conventional circuit. While this implies an inefficient use of the switches, it also means that the thermal loss per switch and diode pair is halved. Thus, the current capability of each switch is increased (theoretically doubled) or the current rating of each switch for a given application can be reduced. In practice, applications using transistors as the switches are defined in terms of their peak current handling capability as well as thermal rating. In many applications the peak current consideration will be dominant, so the transistors may be oversized in terms of thermal load in the circuit of the invention because of this. Nevertheless, this will reduce the heat sinking requirements which may be beneficial in applications in which space is limited.

Figure 9:
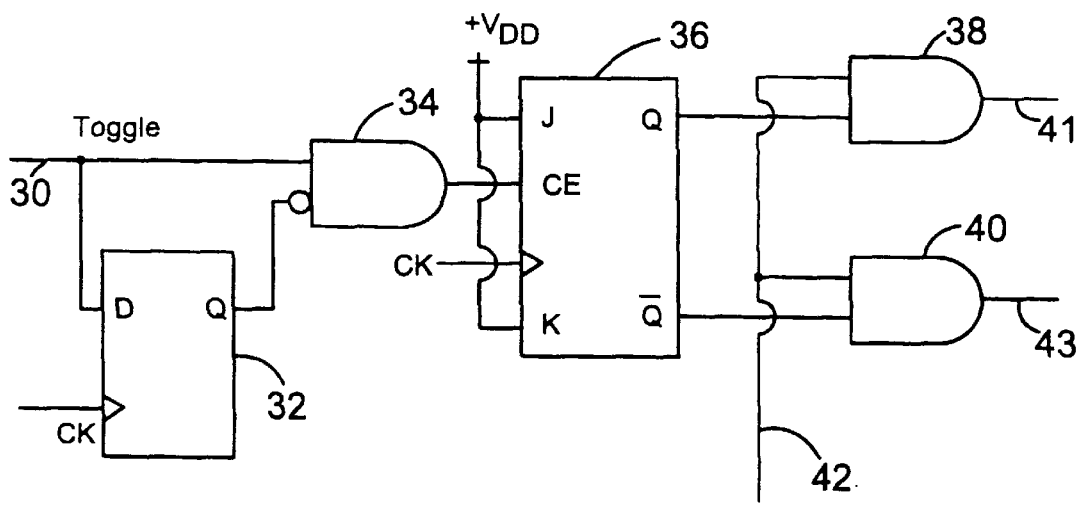
FIG. 9 is a circuit diagram of a control circuit for the switching circuit according to an embodiment of the invention.

FIG. 9 illustrates control logic by which transfer between the switches of the circuit may be effected on alternate phases. A changeover command on line 30 is applied to the data input of a D-type flip-flop 32 and to one input of a two input AND gate 34. The inverted output of the D-type flip-flop is applied to the other input of the AND gate 34. The output of the AND gate 34 is applied to the CE input of a J/K-type flip-flop 36 which receives an enabling voltage VDD at the J and K inputs. AND gates 38/40 provide the driving signal for each of the switches 10 and 12 of the circuit in FIG. 5. The non-inverted output from the J/K-type flip-flop 36 is applied to the AND gate 38 and the inverted output of the flip-flop 36 is applied to the AND gate 40. A switch driving signal is applied on line 42 to the other input of each of the AND gates. The combined action of the flip-flop 36 and the AND gates 38 and 40 is such as to steer the switch driving signal 42 to either of the two outputs 41 and 43 to drive the high-side and low-side switches 10 and 12 respectively.

The changeover command on line 30 is initiated every time an active phase period has ended following enablement of one of the switches. The timed switch driving signal is then available on the output of the AND gate corresponding to the other of the transistors for the next active phase period.

While the invention has been described mainly in connection with switched reluctance motors, it will be appreciated by the skilled person that such a switching circuit is equally applicable to switched reluctance generators subject to well-known adjustment of the control strategy for deriving current from the windings as a result of driving the rotor.

The invention has been described in connection with the illustrative embodiments discussed above, and the skilled person will recognize that many variations may be made without departing from the present invention. For example, while the invention is discussed in terms of a module comprising a half-bridge inverter circuit, it could equally well be implemented in non-modular form. Also, the transistors described are one form of switch which could be used to gate current for exciting the winding. Furthermore, a machine such as a reluctance machine can be constructed as a linear motor in which the moving member is often referred to as a rotor. The term 'rotor' herein is intended to embrace such moving members of linear motors. Accordingly, the above description of the invention is made by way of example and not for purposes of limitation. The invention is intended to be limited only be the spirit and scope of the following claims.

What is claimed is:

1. A switched reluctance machine system comprising:
    a doubly salient reluctance machine having a rotor, a stator and at least one phase winding; and
    a switching circuit comprising a pair of switching devices serially connected between a positive and a negative power rail, a pair of capacitors serially connected between the power rails to define a junction at a common point of connection between the capacitors and being in parallel with the switching devices such that no switching device is connected to said junction, and a diode connected across each switching device to conduct towards the positive rail, the phase winding being connected between the switching devices at one end and between the capacitors at the other end, the switching devices being selectively actuatable to energize the phase winding such that the frequency of current reversal in the phase winding is not greater than half the frequency of the electrical cycle of the machine.

2. A system as claimed in claim 1 in which each of the switching devices is actuated for alternate phase conduction periods.

3. A system as claimed in claim 1 in which each switching device comprises a transistor.

4. A system as claimed in claim 1 in which each switching device and its associated diode are formed as a preconnected module.

5. A system as claimed in claim 1 in which the switching devices and their respectively connected diodes are together formed as a preconnected module.

6. A system as claimed in claim 1 including monitoring means responsive to the voltage between the capacitors exceeding a predetermined threshold magnitude while one of the switching devices is actuated to disable the said one switching device and actuate the other switching device.

7. A method of operating a switching circuit for a phase winding of a switched reluctance machine comprising a rotor, a stator and at least one phase winding, which switching circuit comprises a pair of switching devices serially connected between a positive and a negative power rail, a pair of capacitors serially connected between the power rails to define a junction at a common point of connection between the capacitors and being in parallel with the switching devices such that no switching device is connected to said junction, and a diode connected across each switching device to conduct towards the positive rail, the phase winding being connected between the switching devices at one end and between the capacitors at the other end, the method comprising:
    actuating the switching devices in turn such that the frequency of current reversal in the phase winding is not greater than half the frequency of the electrical cycle of the machine.

8. A method as claimed in claim 7 in which ea ch switching device is selected for groups of successive conduction periods of the machine, the switching devices being selected alternatively for successive groups.

9. A method as claimed in claim 7 in which the voltage at a midpoint between the capacitors is monitored and one of the switching devices is selected when the midpoint voltage exceeds a threshold.

10. A method as claimed in claim 7 in which the switching devices are selected for alternate conduction periods of the sa me phase.

11. A system as claimed in claim 1 wherein the at least one phase winding comprises a coil embracing a single stator pole.

12. A system as claimed in claim 1 wherein the at least one phase winding comprises at least one coil, each embracing a single stator pole.

13. A method as claimed in claim 7 wherein the at least one phase winding comprises a coil embracing a single stator pole.

14. A method as claimed in claim 7 wherein the at least one phase winding comprises at least one coil, each embracing a single stator pole.

* * * * *